US009957057B2

(12) United States Patent
Ferreira et al.

(10) Patent No.: US 9,957,057 B2
(45) Date of Patent: May 1, 2018

(54) AIRCRAFT THROTTLE QUADRANT WITH A GUST LOCK LEVER SYSTEM PROVIDED WITH A SELECTABLE SAFETY STOP

(71) Applicant: EMBRAER S.A., São José dos Campos, São Paulo (BR)

(72) Inventors: André Pires Ferreira, São Paulo (BR); Ayrton Galindo Bernardino Florencio, São Paulo (BR); Claudio Valencise Quaglio, São Paulo (BR); Lauro Rocha Borges, São Paulo (BR); Marcelo Staben Barbosa, São Paulo (BR); Webster Ramos Silva, São Paulo (BR)

(73) Assignee: EMBRAER S.A., São José dos Campos, SP (BR)

( * ) Notice: Subject to any disclaimer, the term of this patent is extended or adjusted under 35 U.S.C. 154(b) by 265 days.

(21) Appl. No.: 14/802,002

(22) Filed: Jul. 17, 2015

(65) Prior Publication Data

US 2017/0015432 A1  Jan. 19, 2017

(51) Int. Cl.
*B64D 31/04* (2006.01)

(52) U.S. Cl.
CPC ............................ *B64D 31/04* (2013.01)

(58) Field of Classification Search
CPC .................................................. B64D 31/04
USPC ........................................................ 244/220
See application file for complete search history.

(56) References Cited

U.S. PATENT DOCUMENTS

| 2,570,586 | A | * | 10/1951 | Nix | B64C 13/14 244/224 |
| 4,567,786 | A | * | 2/1986 | Sakurai | B64D 31/04 244/220 |
| 4,655,414 | A | * | 4/1987 | Ebert | B64D 31/04 244/75.1 |
| 5,488,824 | A | * | 2/1996 | LeDoux | B64D 31/00 244/234 |
| 5,984,241 | A | * | 11/1999 | Sparks | B64D 31/04 244/110 B |
| 8,223,039 | B2 | * | 7/2012 | Campagne | B64D 45/00 340/945 |
| 8,548,714 | B2 | * | 10/2013 | Andrieu | B64D 31/04 244/110 B |

* cited by examiner

*Primary Examiner* — Brian M O'Hara
*Assistant Examiner* — Keith L Dixon
(74) *Attorney, Agent, or Firm* — Nixon & Vanderhye P.C.

(57) ABSTRACT

A gust lock lever system associated with an aircraft throttle quadrant allows flight crew to freely choose which engine to use for ground taxing operations. A stop member is connected to a crossbar of the gust lock lever system for moveable positioning into alignment with a respective one of the port and starboard engine throttle levers. The stop member causes the port and starboard throttle levers to thereby assume an asymmetrically differential side-by-side position relative to one another in response to advancement of the port and starboard throttle levers toward the crossbar when the crossbar is in an intermediate position thereof. The asymmetrically differential side-by-side position of the throttle levers therefore provide the flight crew with an unordinary tactile sensation in the event that the aircraft's engine throttles are attempted to be advanced to a take-off thrust condition with the gust lock lever system improperly deployed in the intermediate ground taxiing position.

10 Claims, 6 Drawing Sheets

AIRCRAFT THROTTLE QUADRANT WITH A GUST LOCK LEVER SYSTEM PROVIDED WITH A SELECTABLE SAFETY STOP

FIELD

The present invention is related generally to thrust controls associated with an aircraft throttle quadrant, especially thrust controls for turbine powered multiengine aircraft that include a throttle gust lock lever.

BACKGROUND

Certain aircraft are equipped with gust lock levers as a part of the throttle quadrant which can be pivoted from a stowed position into a fully upright and operationally deployed position so as to lock the aircraft's flight control surfaces to prevent damage from occurring while on the ramp due to wind gusts, e.g., due to meteorological conditions and/or engine thrust from nearby taxiing aircraft. The gust lock lever is also typically provided with a crossbar extending laterally across the throttle quadrant so as to prevent the individual throttles being advanced from their retarded position when the lever is in its upright operative position.

An intermediate position between the stowed position and the upright operative position is sometimes provided whereby the flight control surfaces are unlocked and the throttles can be advanced somewhat to allow for taxiing with less than full engine thrust while on the ground (thereby minimizing the effect of the aircraft's thrust on surrounding aircraft and/or personnel). Aircraft equipped with such a gust lock lever system will also understandably include a warning system to alert the flight crew that the crossbar of the gust lock lever is in an intermediate position which prevents the throttles from being advanced to a full engine thrust position. In such an arrangement, therefore, the crew may freely choose to ground taxi using the thrust of one engine and, if the warning system is overlooked may attempt takeoff with less than full engine thrust. Such an occurrence could of course have a potentially disastrous outcome if the flight crew does not realize that take-off is being attempted with less than full engine thrust.

In order to assist flight crew recognition that the gust lock lever is in the intermediate position, certain systems may employ a side stepped crossbar which prevents one of the throttles from advancing to the crossbar. In such arrangements, therefore, an attempt to advance both throttles to a full thrust condition will cause the throttles to assume an asymmetrically differential side-by-side position relative to one another. Such asymmetrical positioning of the thrust levers is therefore a tactile warning to the flight crew (who usually grips both throttle handles with a single hand) that the gust lock lever has not been fully stowed in preparation for aircraft take-off. However, after a predetermined number of flight hours, the crossbar needs to be inverted by maintenance personnel so that the step is associated with the other throttle to prevent undue wear on one engine due to continual taxiing demands. Such maintenance action of course means that the aircraft will be taken out of service while the maintenance action is performed.

SUMMARY

Broadly, the embodiments of the present invention are intended to alleviate the problems associated with conventional gust lock lever systems by allowing flight crew to freely choose which engine to use for ground taxing operations with an unordinary tactile sensation of asymmetrically differential side-by-side position yet without the need for maintenance action requiring aircraft service down time.

According to embodiments disclosed herein an aircraft throttle quadrant is provided having port and starboard engine throttle levers, and a gust lock lever system movable between a fully stowed position for aircraft flight operations, a fully deployed position for aircraft ground stop and an intermediate position between the fully stowed and deployed positions for ground taxiing operations. The gust lock lever system may include a crossbar mounted to the throttle quadrant for respective pivotal movements between the fully stowed position, the fully deployed position and the intermediate position, and a stop member connected to the crossbar for moveable positioning into alignment with a respective one of the port and starboard engine throttle levers. The stop member thereby will cause the port and starboard throttle levers to assume an asymmetrically differential side-by-side position relative to one another in response to advancement of the port and starboard throttle levers toward the crossbar when the crossbar is in the intermediate position thereof.

Certain embodiments are provided whereby the stop member is slideably coupled to the crossbar for reciprocal sliding movements between respective alignment positions with the port and starboard throttle levers.

The gust lock lever system may include a manually manipulative trigger to move the crossbar between the fully stowed position, the fully deployed position and the intermediate position, respectively.

According to some embodiments, the aircraft throttle quadrant may comprise a frame having laterally spaced apart side frame members. In such embodiments, the gust lock system may include brackets having one end pivotally connected to respective ones of the side frame members, the crossbar transversely extending between opposite ends of the brackets.

These and other aspects and advantages of the present invention will become more clear after careful consideration is given to the following detailed description of the preferred exemplary embodiments thereof.

BRIEF DESCRIPTION OF ACCOMPANYING DRAWINGS

The disclosed embodiments of the present invention will be better and more completely understood by referring to the following detailed description of exemplary non-limiting illustrative embodiments in conjunction with the drawings of which:

Figure 3A:
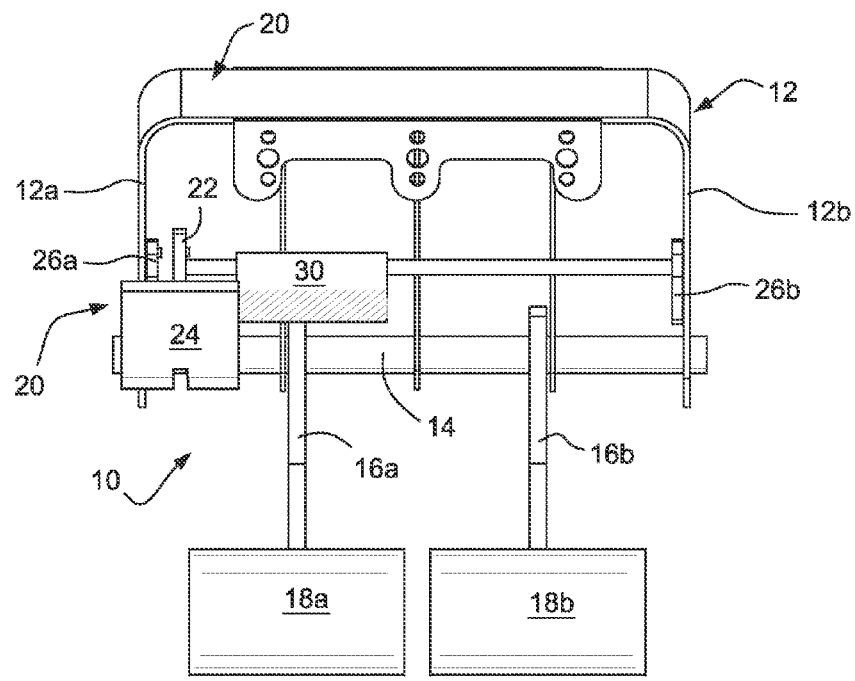
FIGS. 3A and 3B are top plan and perspective views, respectively, of the throttles and gust lock lever system similar to FIGS. 2A and 2B but showing the gust lock lever system in an intermediate condition with the movable crossbar stop aligned with the port engine throttle thereby allowing single engine taxiing operations by the starboard engine throttle.
Figure 3B:
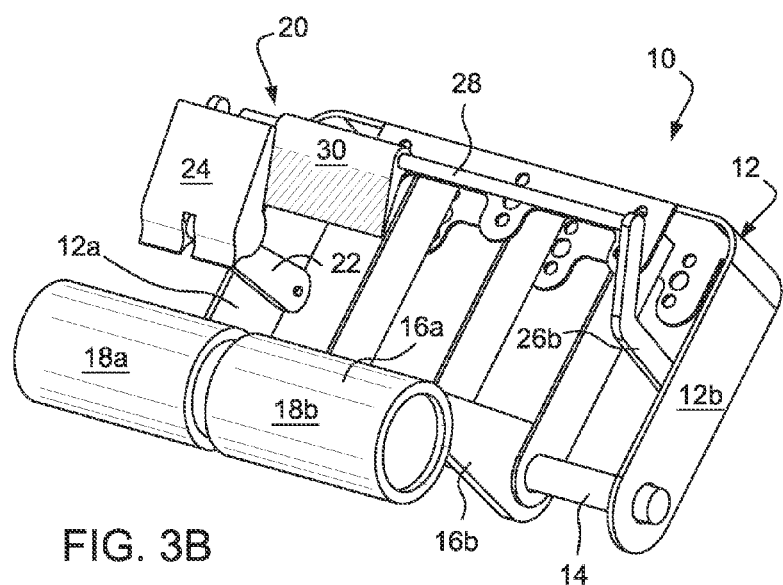
Figure 4A:
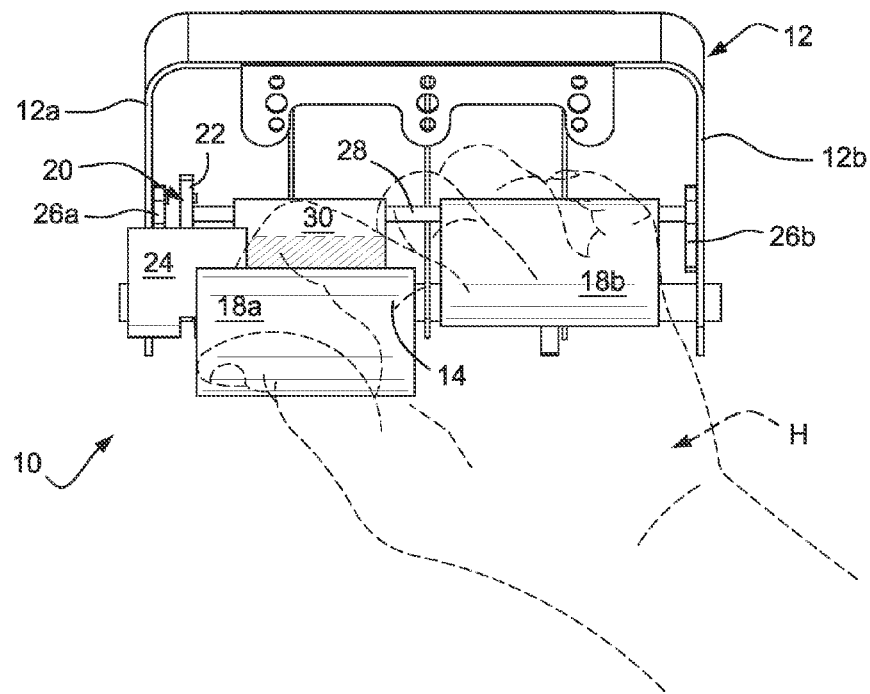
FIGS. 4A and 4B are top plan and perspective views, respectively, of the throttles and gust lock lever system in the position depicted by FIGS. 3A and 3B, but showing the asymmetrically differential side-by-side positioning that is achieved when both port and starboard engine throttles are attempted to be advanced fully.
Figure 4B:
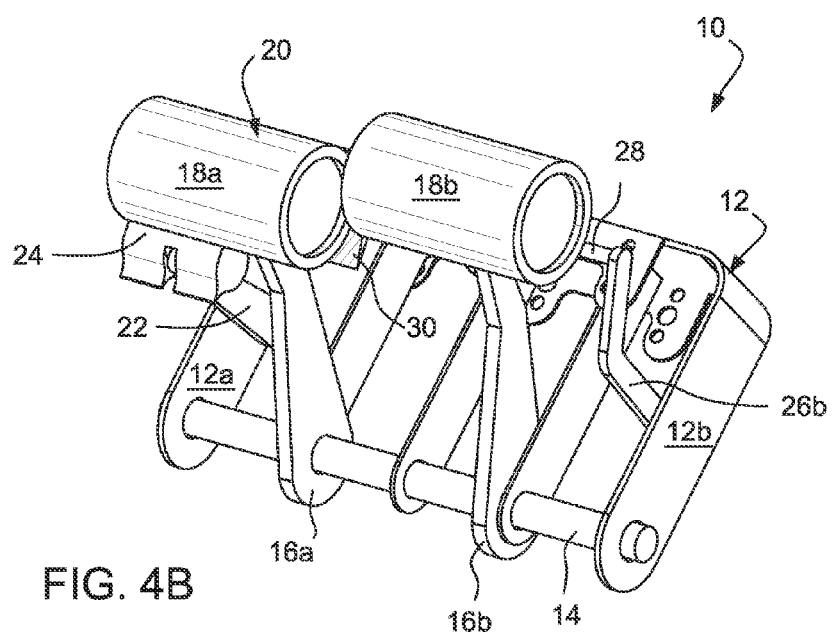
Figure 5A:
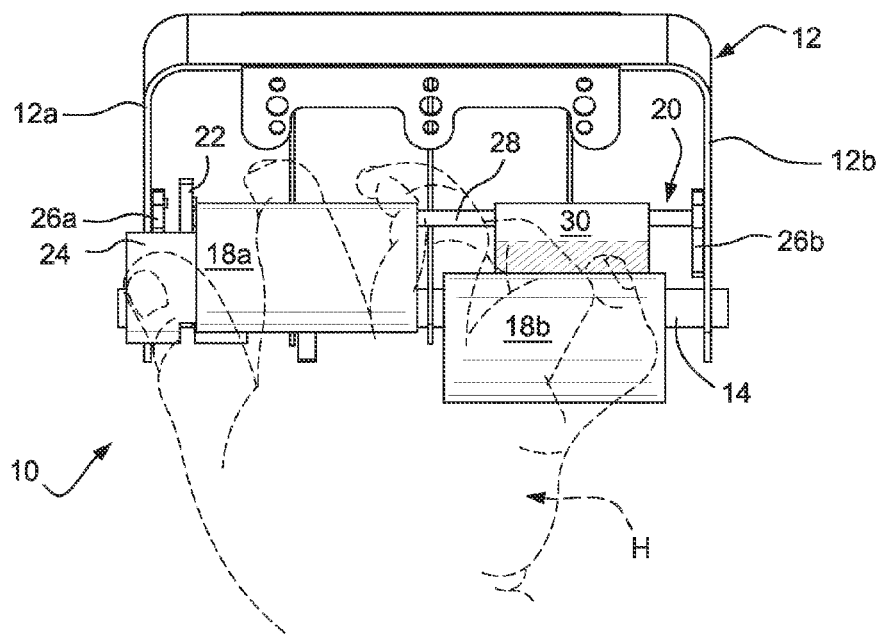
Figure 5B:
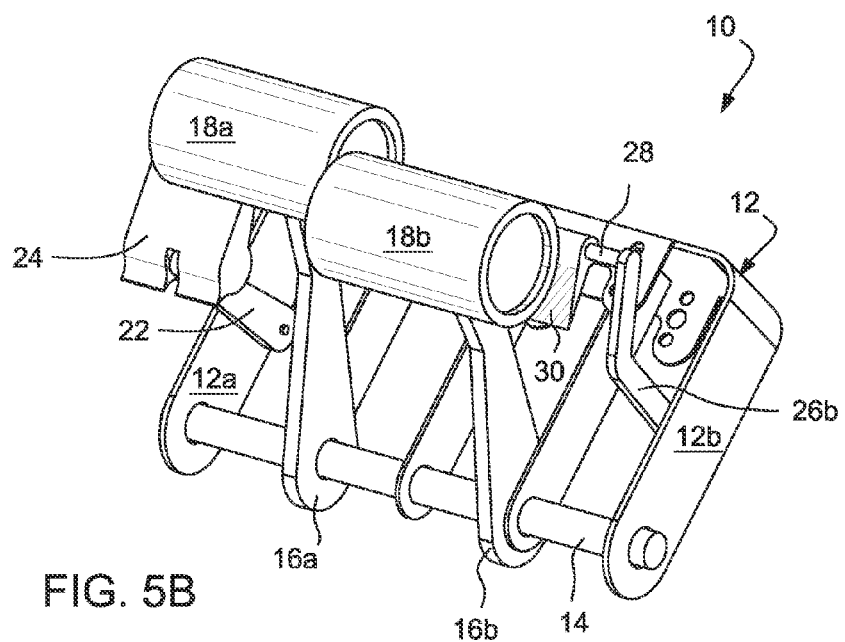
Figure 6A:
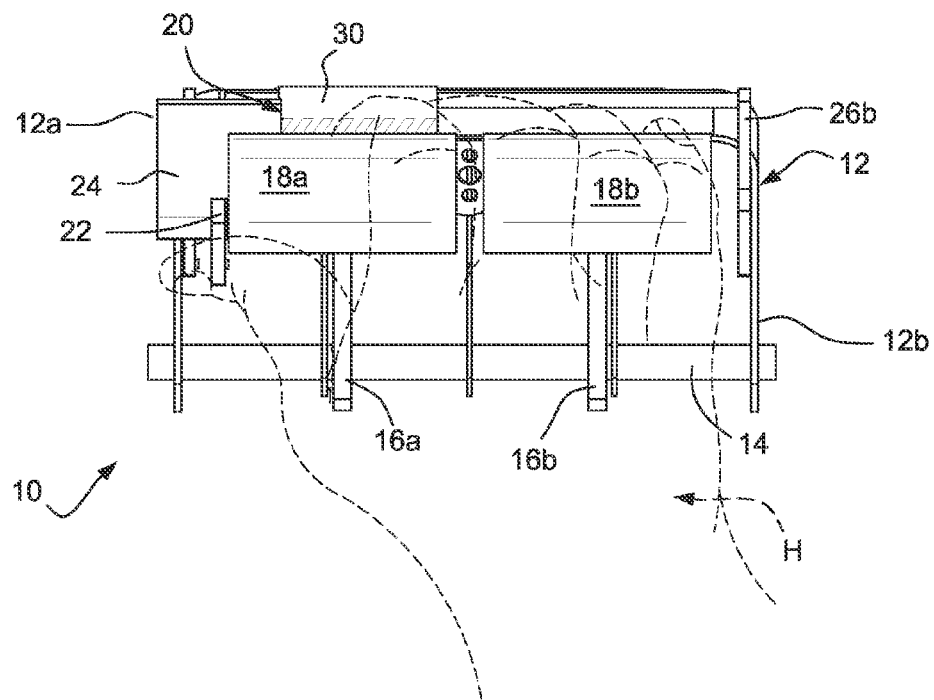
Figure 6B:
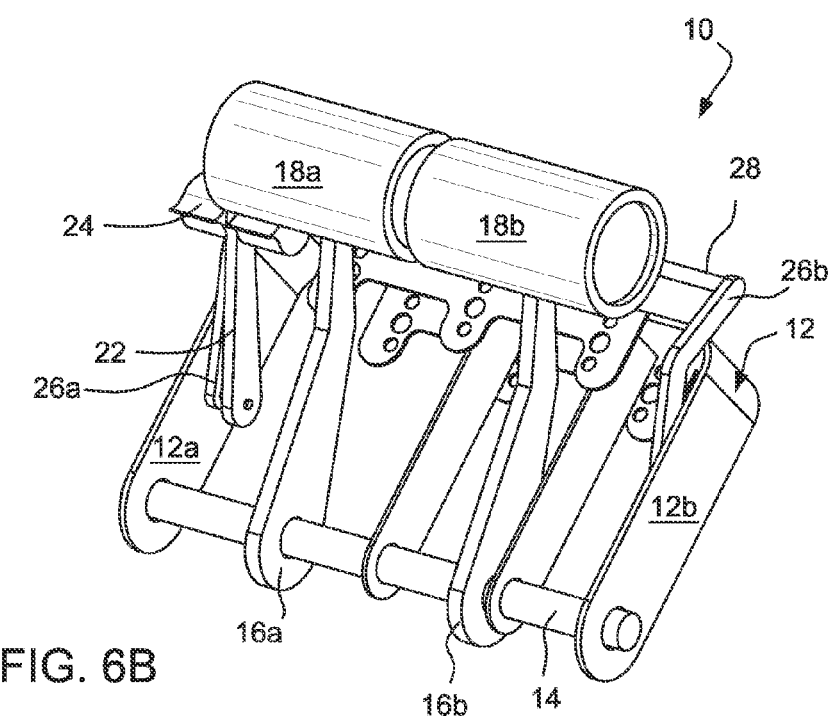

FIGS. 5A and 5B are top plan and perspective views, respectively similar to FIGS. 4A and 4B, but showing the movable crossbar stop aligned with the starboard engine throttle thereby allowing single engine taxiing operations by the port engine throttle; and FIGS. 6A and 6B are top plan and perspective views, respectively, of the throttles and gust lock lever system of the throttle quadrant similar to FIGS. 3A and 3B, but showing the gust lock lever system in a stowed condition and the port and starboard engine throttles in a fully advanced (full engine take-off thrust) condition.

DETAILED DESCRIPTION

Figure 1:
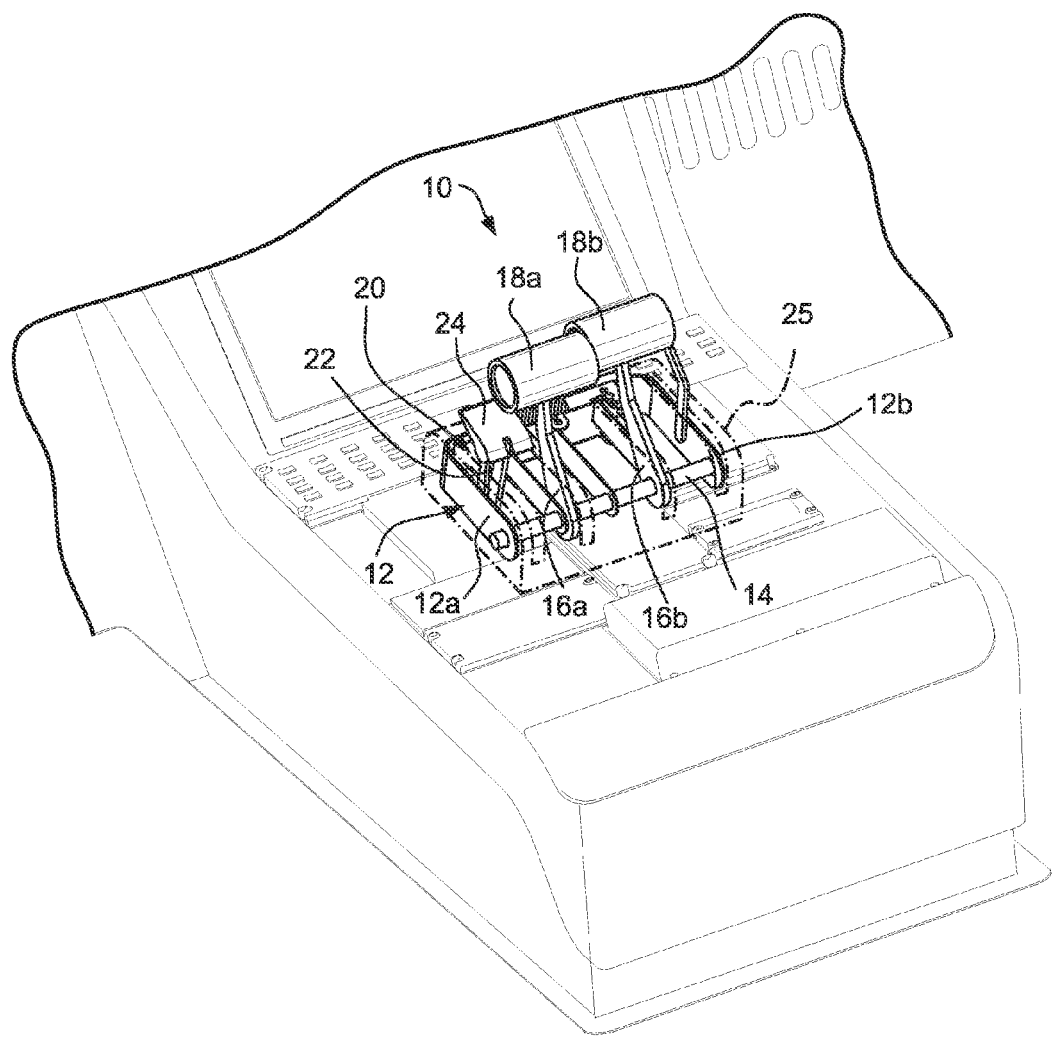
FIG. 1 is a perspective view of an exemplary throttle quadrant of a multiengine aircraft equipped with a gust lock lever system in accordance with an embodiment of the invention.
Figure 2A:
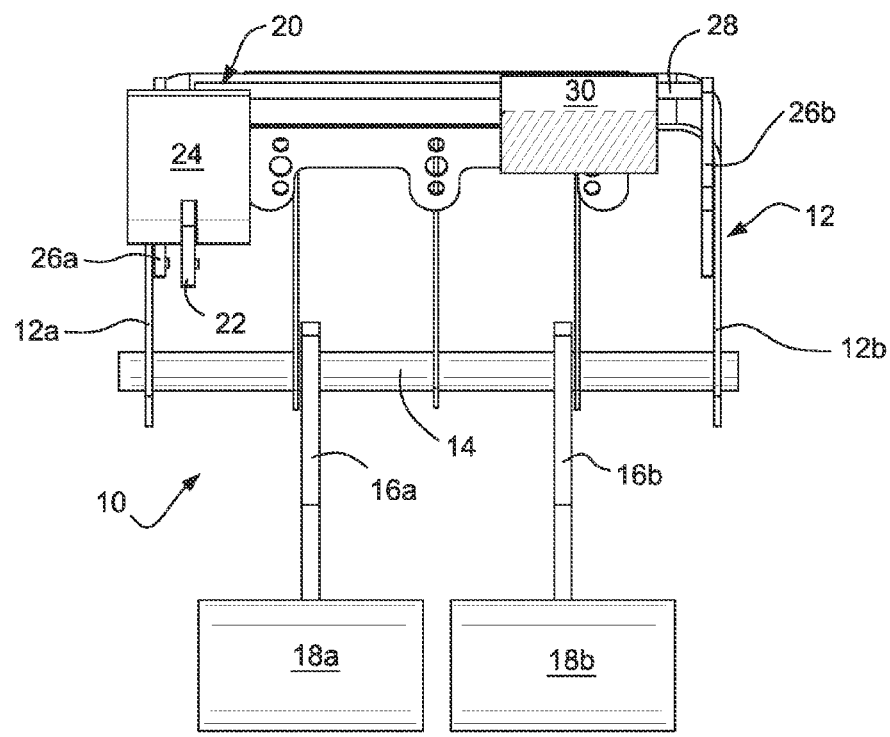
FIGS. 2A and 2B are top plan and perspective views, respectively, of the throttles and gust lock lever system of the throttle quadrant depicted in FIG. 1 showing the gust lock lever system in a stowed condition and the port and starboard engine throttles in a fully retarded (engine idle thrust) condition.
Figure 2B:
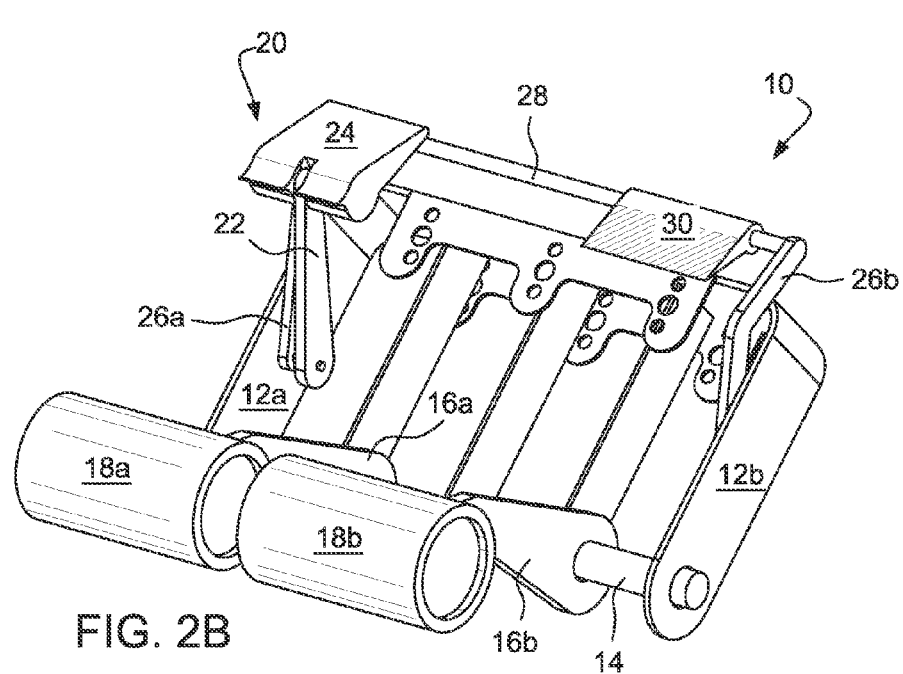

An exemplary aircraft throttle quadrant 10 associated within a cockpit of a twin-engine jet propelled aircraft is depicted in the accompanying FIG. 1. As shown, the throttle quadrant includes a generally U-shaped frame member 12 provided with a cross-wise extending throttle axle rod 14 connected operatively to lower ends of the port and starboard engine throttle levers 16a, 16b, respectively, to allow each to be independently pivoted about the axis of the rod 14. The upper ends of the levers 16a, 16b are provided with conventional T-handles 18a, 18b, respectively, to allow the throttle levers to be manually manipulated by the flight crew. As is known, the throttle levers 16a, 16b are connected operatively to the on-board engine control system (not shown) so as to be capable over being moved throughout a range between a fully retarded condition (i.e., wherein the throttle levers 16a, 16b are pivoted about the rod 14 toward the aft section of the aircraft to achieve idle or zero engine thrust) and a fully advanced condition (i.e., wherein the throttle levers 16a, 16b are pivoted about the rod toward the forward section of the aircraft to achieve full take-off engine thrust).

The throttle quadrant 10 is also provided with a gust lock lever system 20 having an operational lever 22 pivotally connected to the frame 12 for pivotal movements between a fully stowed position for aircraft take-off, a fully operationally deployed position for aircraft parking, and an intermediate position for aircraft taxiing between the stowed and deployed positions. A trigger 24 is provided at the upper end of the lever 22 so as to allow manual manipulation thereof in the manner to be described below.

The throttle quadrant is typically provided with a cover member 25 having openings therein which allow the throttle levers 16a, 16b and the operational lever 22 of the gust lock lever system 20 to protrude outwardly therefrom for manual manipulation by the flight crew.

As is perhaps more clearly shown by FIGS. 2A-2B and FIGS. 3A-3B, the gust lock lever system 20 includes side brackets 26a, 26b pivotally attached at lower end thereof to respective side legs 12a, 12b of the U-shaped frame 12. A crossbar 28 extends between and is attached to the upper ends of the brackets 26a, 26b. The lever 22 is attached to bracket 26a so that manual manipulation of the trigger 24 causes the brackets 26a, 26b to pivotally move relative to the frame 12 to deploy the crossbar 28 from the stowed position shown in FIGS. 2A and 2B to a fully deployed position (not shown) adjacent the fully retarded throttle levers 16a, 16b and an intermediate position shown, for example, in FIGS. 3A and 3B. Important to the embodiments of the invention disclosed herein, a stop member 30 is operatively associated with the crossbar 28 so as to be reciprocally slideably movable therealong into respective different positions whereby the stop member 30 is aligned with either the port throttle lever 16a of the starboard throttle lever 16b.

As is shown in FIGS. 4A and 4B, the gust lock lever system 20 has been pivotally moved by manual manipulation of the trigger 24 into an intermediate position thereof with the stop member 30 having been moved along crossbar 28 in a leftward direction so as to be in alignment with the port throttle lever 16a. While in such a position, the aircrew may employ the starboard throttle lever 16b for ground taxiing operations. However, should an attempt be made to fully advance both throttle levers 16a and 16b into a take-off position, the port throttle lever 16a will be brought into abutment with the stop member 30 while the starboard throttle lever 16b will be brought into abutment with the crossbar 28. Such abutments will therefore cause the handles 18a, 18b to assume an asymmetrically differential side-by-side position relative to one another which provides a tactile sensation to the flight crew member (e.g., by virtue of the canted position of the flight crew member's hand H noted in dashed line in FIG. 4A). This asymmetrically different positioning of the handles 18a, 18b will thus alert the flight crew member that the gust lock lever system 20 has not been fully stowed for take-off.

A similar situation will present itself if the flight crew member chooses to employ the port engine for ground taxiing operations. In such a situation, the flight crew member will slideably move the stop member 30 rightward so as to be in alignment with the starboard throttle lever 16b. While in such a position, an attempt to advance the throttle levers 16a and 16b fully to the take-off condition will case starboard throttle lever 16b to be brought into abutment with the stop member 30 while the port throttle lever 16a is brought into abutment with the crossbar 28. As in the situation discussed previously with reference to FIGS. 4A and 4B, such abutments will therefore cause the handles 18a, 18b to assume an asymmetrically differential side-by-side position relative to one another which provides a tactile sensation to the flight crew member (e.g., by virtue of the canted or splayed position of the flight crew member's hand H noted in dashed line in FIG. 5A). This asymmetrically different positioning of the handles 18a, 18b will thus likewise alert the flight crew member that the gust lock lever system 20 has not been fully stowed for take-off.

It is therefore only when the gust lock lever system 20 is moved into its fully stowed position can the throttle levers 16a, 16b be advanced symmetrically to the full take-off thrust condition, in which case the flight crewmember's hand is not provided with a tactile sense of asymmetric displacement of the handles 18a, 18b relative to one another. Such a state is shown by FIGS. 6A and 6B.

Instead of being slideably associated with the crossbar 28, the stop member 30 may be connected to the crossbar 28 so as to be pivotally flipped between respective alignment positions with the port and starboard throttle levers 16a, 16b. Other modifications may be envisioned by those skilled in the art to achieve the selective positioning of the stop member 30 as described above.

Thus, the invention herein is not to be limited to the disclosed embodiment, but on the contrary, is intended to cover various modifications and equivalent arrangements included within the spirit and scope of the appended claims.

What is claimed is:

1. An aircraft throttle quadrant comprising:
port and starboard engine throttle levers, and
a gust lock lever system movable between a fully stowed position for aircraft flight operations, a fully deployed position for aircraft ground stop and an intermediate position between the fully stowed and deployed positions for ground taxiing operations, wherein the gust lock lever system includes,
(i) a crossbar mounted to the throttle quadrant for respective pivotal movements between the fully stowed position, the fully deployed position and the intermediate position, and
(ii) a stop member connected to the crossbar for moveable positioning into alignment with a respective one of the port and starboard engine throttle levers, wherein the stop member causes the port and starboard throttle levers to assume an asymmetrically differential side-by-side position relative to one another in response to advancement of the port and starboard throttle levers toward the crossbar when the crossbar is in the intermediate position thereof.

2. The aircraft throttle quadrant of claim 1, wherein the stop member is slideably coupled to the crossbar for reciprocal sliding movements between respective alignment positions with the port and starboard throttle levers.

3. The aircraft throttle quadrant of claim 1, wherein the gust lock lever system comprises a manually manipulative trigger to move the crossbar between the fully stowed position, the fully deployed position and the intermediate position, respectively.

4. The aircraft throttle quadrant of claim 1, further comprising a frame having laterally spaced apart side frame members, wherein the gust lock system comprises brackets having one end pivotally connected to respective ones of the side frame members, the crossbar transversely extending between opposite ends of the brackets.

5. The aircraft throttle quadrant of claim 4, wherein the gust lock lever system comprises a manually manipulative trigger operatively connected to at least one of the brackets to move the crossbar between the fully stowed position, the fully deployed position and the intermediate position, respectively.

6. The aircraft throttle quadrant of claim 1, further comprising a throttle axle rod, wherein a lower end of the port and starboard throttle levers is pivotally connected to the throttle axle rod.

7. The aircraft throttle quadrant of claim 6, wherein each of the port and starboard throttle levers includes a T-handle at an upper end thereof.

8. The aircraft throttle quadrant of claim 7, further comprising a frame having laterally spaced apart side frame members, wherein the gust lock system comprises brackets having one end pivotally connected to respective ones of the side frame members, the crossbar transversely extending between opposite ends of the brackets.

9. The aircraft throttle quadrant of claim 8, wherein the gust lock lever system comprises a manually manipulative trigger operatively connected to at least one of the brackets to move the crossbar between the fully stowed position, the fully deployed position and the intermediate position, respectively.

10. An aircraft which comprises the aircraft throttle quadrant of claim 1.

* * * * *